(12) United States Patent
Cho et al.

(10) Patent No.: US 7,505,250 B2
(45) Date of Patent: Mar. 17, 2009

(54) CARBON-POROUS MEDIA COMPOSITE ELECTRODE AND PREPARATION METHOD THEREOF

(75) Inventors: Byung Won Cho, Seoul (KR); Won Il Cho, Seoul (KR); Dong Jin Suh, Seoul (KR); Chun Mo Yang, Seoul (KR); Woon Hyuk Choi, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 674 days.

(21) Appl. No.: 11/024,618

(22) Filed: Dec. 29, 2004

(65) Prior Publication Data

US 2005/0155216 A1    Jul. 21, 2005

(30) Foreign Application Priority Data

Jan. 16, 2004    (KR)    .................. 10-2004-0003357

(51) Int. Cl.
*H01G 4/06*    (2006.01)
(52) U.S. Cl. ................. 361/321.4; 361/321.5; 361/504; 361/508; 361/502; 361/512
(58) Field of Classification Search ............. 361/321.4, 361/321.5, 502–504, 508–512, 301.1, 301.2, 361/302–305
See application file for complete search history.

(56) References Cited

U.S. PATENT DOCUMENTS

| | | | |
|---|---|---|---|
| 5,953,204 A | * | 9/1999 | Suhara et al. ............... 361/502 |
| 6,214,204 B1 | | 4/2001 | Gadkaree et al. |
| 6,225,733 B1 | * | 5/2001 | Gadkaree et al. ............. 313/352 |
| 6,602,742 B2 | * | 8/2003 | Maletin et al. .............. 438/142 |
| 6,697,249 B2 | * | 2/2004 | Maletin et al. .............. 361/502 |
| 2002/0057549 A1 | * | 5/2002 | Oyama et al. ............... 361/303 |

FOREIGN PATENT DOCUMENTS

| | | |
|---|---|---|
| JP | 57-97612 | 6/1982 |
| JP | 63-316422 | 12/1988 |
| JP | 08-279354 | 10/1996 |
| JP | 10-188957 | 7/1998 |
| JP | 10-255807 | 9/1998 |
| JP | 11-135379 | 5/1999 |
| JP | 2001-93783 | 4/2001 |
| JP | 2001-283861 | 10/2001 |
| JP | 2002-124307 | 4/2002 |

OTHER PUBLICATIONS

Japanese Office Action dated Oct. 3, 2006 issued for corresponding Japanese Patent Application No. 2004-381984.
Joseph C. Farmer, et al., "Capacitive Deionization of NaCl and NaNO3 Solutions with Carbon Aerogel Electrodes", Electrochem. Soc., vol. 143, No. 1, 1996, 159-169.
Joseph C. Farmer et al., "Electrosorption of Chromium Ions on Carbon Aerogel Electrodes as a Means of Remediating Ground Water", Energy & Fuels, 1997, 11, 337-347.

* cited by examiner

*Primary Examiner*—Nguyen T Ha
(74) *Attorney, Agent, or Firm*—Darby & Darby PC

(57) ABSTRACT

The present invention discloses a carbon-porous media composite electrode material, a composite electrode using the same and a preparation method thereof. The carbon-porous media composite electrode can be applied for a device such as a secondary battery, a capacitor or the like, or for preparing ultra pure water using a capacitive deionization process, purifying salty water or the like.

8 Claims, 16 Drawing Sheets

CARBON-POROUS MEDIA COMPOSITE ELECTRODE AND PREPARATION METHOD THEREOF

BACKGROUND OF THE PRESENT INVENTION

1. Field of the present invention

The present invention relates to a carbon-porous media composite electrode material, a composite electrode using the same, and a preparation method thereof.

2. Description of the Background Art

A capacitive deionization (hereinafter, referred to as 'CDI') processing apparatus is an apparatus that removes ions present in a solution by electrochemically adsorbing them onto an electrode surface. As an active material of an electrode for capacitive deionization process, used are activated carbon, carbon aerogel, carbon nanotube, etc.

Carbon aerogel has been known as an ideal material for a CDI electrode because it has a high specific surface area (from 400 to 1100 $m^2/g$), a low electric resistance (400 $m\Omega/cm$) and a nano-sized porous structure, and because its pores are connected to one another, its pore size and density can be adjustable, and its electric conductivity is excellent. Besides, its preparation process is simple and its capacitance is very excellent. It has been known that in a CDI process, a carbon aerogel electrode can remove heavy metals, colloids and the like, as well as ions.

By the way, the biggest problem involved in constructing an electrode for a capacitive deionization process using carbon aerogel or other carbon materials as an electrode material is that the surface of those materials are hydrophobic, and thus they rarely have wetting ability to an aqueous electrolyte. Therefore, in order to use a carbon material for an electrode for deionization process in an aqueous electrolyte, it is necessary to be used in great quantities. However, carbon aerogel, carbon nanotube and the like are expensive because a very small amount thereof is obtained in a single preparation. Therefore, if concentration of ions to be removed in a solution is high, there is a difficulty in using them.

Moreover, when an electrode is prepared only with a carbon electrode material, as charging and discharging are repeated, mechanical strength of the electrode active material becomes weaker, and thus, the electrode active material is separated from the electrode so as to reduce its lifetime.

Therefore, in order to use carbon materials for an electrode for a deionization processing apparatus, it is necessary to modify its physical properties.

SUMMARY OF THE PRESENT INVENTION

Therefore, an object of the present invention is to provide a carbon-porous media composite electrode material which has excellent hydrophilicity to an aqueous electrolyte, mechanical strength and CDI properties even used in small amount, and can be prepared with simple process, and to provide a composite electrode using the same and a preparation method thereof.

BRIEF DESCRIPTION OF THE DRAWINGS

Reference will now be made in detail to the preferred embodiments of the invention, examples of which are illustrated in the accompanying drawings.

The accompanying drawings, which are included to provide a further understanding of the present invention and are incorporated in and constitute a part of this specification, illustrate embodiments of the present invention and together with the description serve to explain the principles of the present invention.

In the drawings:

FIG. 1 is a process chart for preparing a porous composite electrode material in accordance with the present invention;

FIG. 2 is a scanning electron microphotograph showing a fine structure of the surface of a porous composite electrode material in accordance with the present invention;

FIGS. 3a to 3d are graphs respectively showing current changes with respect to time upon charging and discharging to ten cycles for batteries prepared in Comparative Example 1 and Examples 1 to 3 of the present invention;

FIG. 4 is a graph showing CDI efficiencies (charging and discharging efficiency) using the results of charging and discharging the batteries constructed with a porous composite electrode material in accordance with the present invention;

FIGS. 5a and 5b are graphs respectively showing changes in electric charge per weight of an electrode active material, upon charging (FIG. 5a) and discharging (FIG. 5b) of the batteries constructed with a porous composite electrode material in accordance with the present invention;

FIGS. 6a to 6c are graphs respectively showing current changes with respect to time upon charging and discharging to 100 cycles of the batteries prepared in Comparative Example 1 and Examples 1 to 3 of the present invention;

FIG. 7 is a graph showing charging and discharging efficiencies using the results of charging and discharging to 100 cycles of the batteries constructed with a porous composite electrode material in accordance with the present invention;

FIG. 8 is a graph showing a change in electric charge per weight of an electrode active material upon charging and discharging to 100 cycles of the batteries constructed with a porous composite electrode material in accordance with the present invention;

FIGS. 9a to 9f are graphs respectively showing current changes with respect to time showing charging and discharging characteristics to 100 cycles of the batteries prepared in Comparative Example 2 and Examples 4 to 8 of the present invention;

Figure 10A:
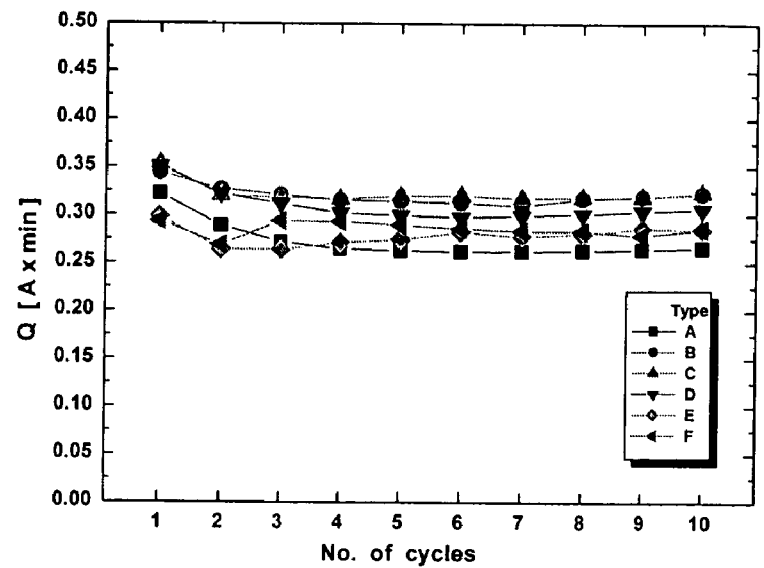
Figure 10B:
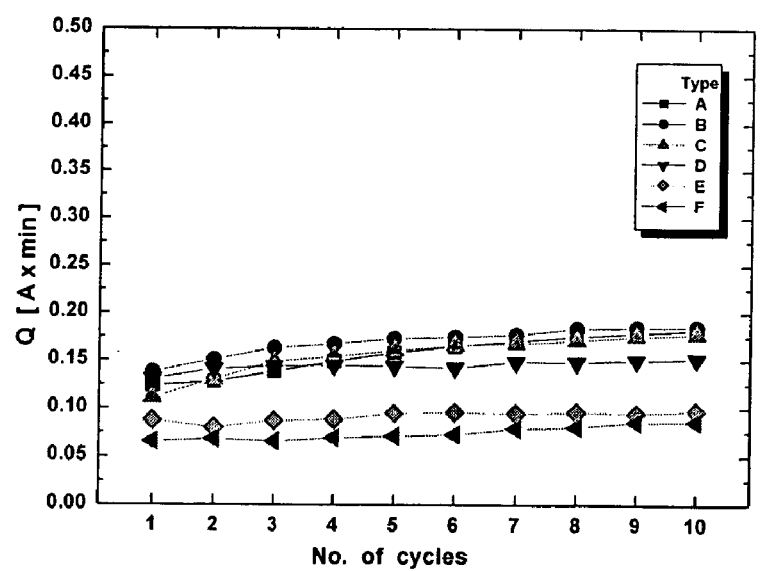
Figure 11A:
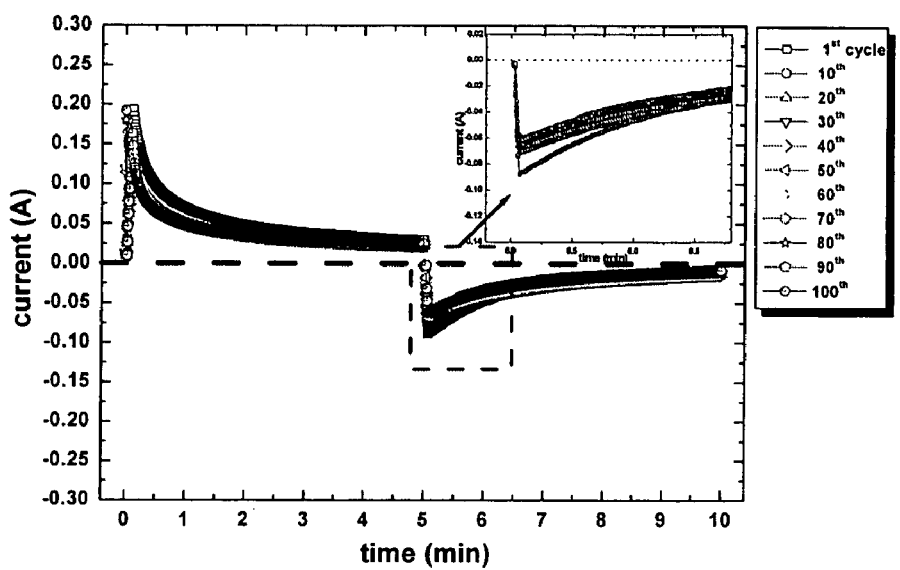
Figure 11B:
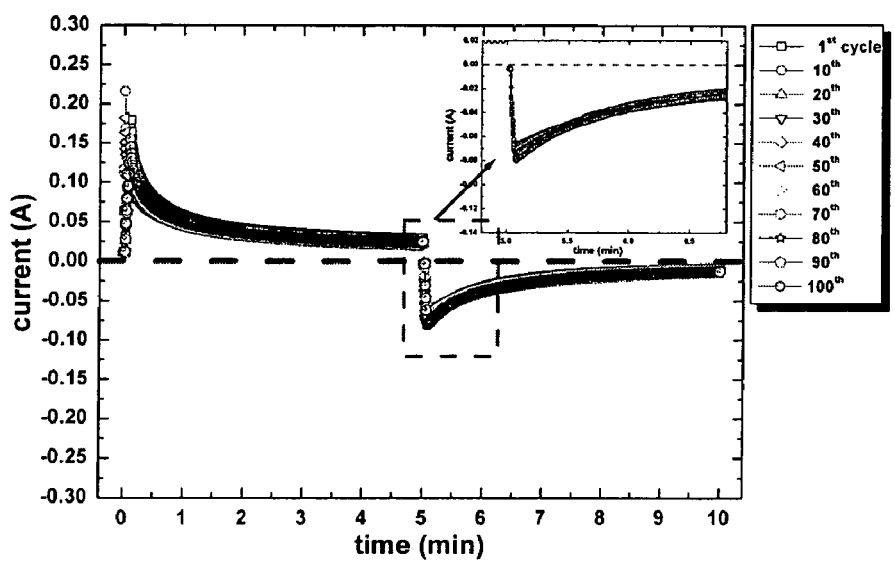

FIGS. 10a and 10b respectively show electric charge efficiencies of charging and discharging of batteries prepared in Comparative Example 2 and Examples 4 to 8 of the present invention. In FIGS. 10a and 10b, A is for the battery prepared in Comparative Example 2, and B to F are for the batteries prepared in Examples 4 to 8, respectively;

FIGS. 11a and 11b are graphs respectively showing current changes with respect to time showing charging and discharging characteristics to 100 cycles of the batteries prepared in Comparative Example 2 and Example 6 of the present invention; and FIGS. 12a to 12d are graphs respectively showing electric charges upon charging (FIG. 12a) and electric charges upon discharging (FIG. 12b), specific electric charges upon discharging (FIG. 12c), and charging and discharging efficiencies (FIG. 12d) using the results of charging and discharging to 100 cycles of the batteries prepared in Comparative Example 2 and Example 6 of the present invention.

DETAILED DESCRIPTION OF THE PREFERRED EMBODIMENTS

The present inventors achieved the aforementioned object by preparing a carbon-porous media composite electrode material in which a carbon electrode active material is combined with a porous media (support) utilized in the filed of catalyst.

Accordingly, the present invention relates to a carbon-porous media composite electrode material that can be used in a capacitive deionization process, a composite electrode using the same and a preparation method thereof.

The carbon-porous media composite electrode material of the present invention comprises 5 to 95% by weight of a carbon electrode active material and 5 to 95% by weight of a porous media.

The carbon electrode active material used in the present invention may include, but not limited thereto, activated carbons, carbon aerogels, carbon nanotubes, carbon nanofibers and the like, having particle size distribution of from 1 to 100 μm, and any carbon electrode active materials known to those skilled in the art can be used.

The porous media used in the present invention also has no specific limitations on its types and includes, for example, silica gel powder, clay powder, $TiO_2$, $Al_2O_3$, $SiO_2$, $BaTiO_3$, porous polymers and the like, having a particle size distribution of from 0.1 to 100 μm and a particle density of from 0.1 to 2 g/cc. The clay powder may include kaolin, white clay, loess, etc.

The carbon-porous media composite electrode material of the present invention may additionally contain a conductive material capable of improving the conductivity of an electrode and/or a polymer binder.

The conductive material may include acetylene black, ketjen black, graphite (sfg 6), super-P or the like, but not limited thereto. When a conductive material is added, that is, in case that a carbon-porous media composite electrode material contains a carbon electrode active material, a porous media and a conductive material, the content of the conductive material is preferably 1 to 50% by weight.

Examples of the polymer binder may include polytetrafluoroethylene (PTFE), polyvinylidenefluoride (PVdF), carboxymethylcellulose (CMC), hydropropylmethylcellulose (HPMC), polyvinylalcohol (PVA), polyvinylchloride (PVC), etc., but not limited thereto, and any kinds of binders commonly used in preparation of an electrode can be also used. When a binder is added, it is preferable to be added to a mixture consisting of a carbon electrode active material, a porous media and a conductive material, in an amount of 1 to 20% by weight of the total weight of the mixture.

The preparation method of a carbon-porous media composite electrode material of the present invention comprises the steps of:

(1) mixing a carbon electrode active material and a porous media at a predetermined ratio;

(2) mixing the mixture obtained in step (1) with an organic solvent; and (3) evaporating the organic solvent to obtain a composite electrode material in a sheet form.

The organic solvent of step (2) may be an alcohol such as ethyl alcohol, methyl alcohol or isopropyl alcohol, or a mixed solvent of those alcohols with acetone. If a mixed solvent is used, the ratio of alcohol to acetone is 50:50 by volume. The organic solvent is preferably used in an amount of 0.5 to 5 times by weight of the mixture of step (1).

The present invention also relates to a carbon-porous media composite electrode prepared with the carbon-porous media composite electrode material prepared as described above.

The composite electrode of the present invention can be prepared by a roll pressing the carbon-porous media composite electrode material obtained in step (3) onto a current collector such as a nickel, titanium or aluminum metal foam, or meshes of those metals.

The carbon-porous media composite electrode of the present invention can be used as an electrode for a secondary battery using the composite electrode as an anode and a metal oxide as a cathode, for a capacitor, or for a capacitive deionization apparatus.

Accordingly, the present invention also relates to a secondary battery, a capacitor and a capacitive deionization apparatus, comprising a carbon-porous media composite electrode.

EXAMPLE

Hereinafter, the present invention will be described in more detail by the following examples, but these examples are just provided for illustration and the scope of the present invention is not, in any way, limited thereto.

Example 1

3 g of carbon aerogel dried for at least 24 hours at 80° C., 1 g of acetylene black (moisture content: 0.03 % by weight; ash content: 0.001 % by weight; bulk density: 12.9 $lbsft^{-3}$; actual density: 1.95 g/ml; surface area: 80 $g^2m^{-1}$; available from Osaka Gas Co.), 1 g of porous silica gel (231-545-4, 0.040-0.063 mm, available from Lancaster Co.), 0.25 g of PTFE and 5 g of ethyl alcohol were mixed. The resulting mixture was uniformly stirred for one hour at room temperature. The resultant was then made into a sheet from fibers formed by kneading them while evaporating an ethyl alcohol solvent.

The composite electrode material obtained was then pressed onto a nickel foam to obtain a composite electrode, which was then used to assemble a battery by constructing in the form of a porous composite electrode/non-woven fabric/porous composite electrode. This battery was put into a water cistern containing 1,000 ppm aqueous NaCl solution, charged up to 0.9V for 10 minutes, discharged down to −0.001V for 10 minutes, and maintained a dormant state for one minute, and then its CDI properties and cycle life were examined.

Example 2

2 g of carbon aerogel dried for at least 24 hours at 80° C., 1 g of acetylene black (moisture content: 0.03% by weight; ash content: 0.001% by weight; bulk density: 12.9 $lbsft^{-3}$; actual density: 1.95 g/ml; surface area: 80 $g^2m^{-1}$, available from Osaka Gas Co.), 2 g of porous silica gel (231-545-4, 0.040-0.063 mm, available from Lancaster Co.), 0.25 g of PTFE and 5 g of ethyl alcohol were mixed. The resulting mixture was uniformly stirred for one hour at room temperature, and then made into a sheet from fibers formed by kneading them while evaporating an ethyl alcohol solvent.

The composite electrode material obtained was then pressed onto a nickel foam to obtain a composite electrode, which was then used to assemble a battery by constructing in the form of a porous composite electrode/non-woven fabric/porous composite electrode. This battery was put into a water cistern containing 1,000 ppm aqueous NaCl solution, charged up to 0.9V for 10 minutes, discharged down to −0.001V for 10 minutes, and maintained a dormant state for one minute, and then its CDI properties and cycle life were examined.

Example 3

1 g of carbon aerogel dried for at least 24 hours at 80° C., 1 g of acetylene black (moisture content: 0.03% by weight; ash content: 0.001% by weight; bulk density: 12.9 $lbsft^{-3}$; actual density: 1.95 g/ml; surface area: 80 $g^2m^{-1}$, available from Osaka Gas Co.) as a conductive material for improving conductivity, 3 g of porous silica gel (231-545-4, 0.040-0.063 mm, available from Lancaster Co.), 0.25 g of PTFE and 5 g of ethyl alcohol were mixed. The resulting mixture was uniformly stirred for one hour at room temperature, and then made into a sheet from fibers formed by kneading them while evaporating an ethyl alcohol solvent.

The composite electrode material obtained was then pressed onto a nickel foam to obtain a composite electrode, which was then used to assemble a battery by constructing in the form of a porous composite electrode/non-woven fabric/porous composite electrode. This battery was put into a water cistern containing 1,000 ppm aqueous NaCl solution, charged up to 0.9V for 10 minutes, discharged down to −0.001V for 10 minutes, and maintained a dormant state for one minute, and then its CDI properties and cycle life were examined.

Example 4

8 g of activated carbon (pitch-based carbon or pan-based carbon) dried for at least 24 hours at 80° C., 2.5 g of acetylene black (moisture content: 0.03% by weight; ash content: 0.001% by weight; bulk density: 12.9 $lbsft^{-3}$; actual density: 1.95 g/ml; surface area: 80 $g^2m^{-1}$, available from Osaka Gas Co.), 2 g of porous silica gel (231-545-4, 0.040-0.063 mm, available from Lancaster Co.), 0.5 g of PTFE and 10 g of ethyl alcohol were mixed. The resulting mixture was uniformly stirred for one hour at room temperature, and then made into a sheet from fibers formed by kneading them while evaporating an ethyl alcohol solvent.

The composite electrode material obtained was then pressed onto a nickel foam to obtain a composite electrode, which was then used to assemble a battery by constructing in the form of a porous composite electrode/non-woven fabric/porous composite electrode. This battery was put into a water cistern containing 1,000 ppm aqueous NaCl solution, charged up to 0.9V for 10 minutes, discharged down to −0.001V for 10 minutes, and maintained a dormant state for one minute, and then its CDI properties and cycle life were examined.

Example 5

6 g of activated carbon dried for at least 24 hours at 80° C., 2.5 g of acetylene black (moisture content: 0.03 % by weight; ash content: 0.001% by weight; bulk density: 12.9 $lbsft^{-3}$; actual density: 1.95 g/ml; surface area: 80 $g^2m^{-1}$, available from Osaka Gas Co.), 4 g of porous silica gel (231-545-4, 0.040-0.063 mm, available from Lancaster Co.), 0.5 g of PTFE and 10 g of ethyl alcohol were mixed. The resulting mixture was uniformly stirred for one hour at room temperature, and then made into a sheet from fibers formed by kneading them while evaporating an ethyl alcohol solvent.

The composite electrode material obtained was then pressed onto a nickel foam to obtain a composite electrode, which was then used to assemble a battery by constructing in the form of a porous composite electrode/non-woven fabric/porous composite electrode. This battery was put into a water cistern containing 1,000 ppm aqueous NaCl solution, charged up to 0.9V for 10 minutes, discharged down to −0.001V for 10 minutes, and maintained a dormant state for one minute, and then its CDI properties and cycle life were examined.

Example 6

4 g of activated carbon dried for at least 24 hours at 80° C., 2.5 g of acetylene black (moisture content: 0.03% by weight; ash content: 0.001% by weight; bulk density: 12.9 $lbsft^{-3}$;
actual density: 1.95 g/ml; surface area: 80 $g^2m^{-1}$, available from Osaka Gas Co.), 6 g of porous silica gel (231-545-4, 0.040-0.063 mm, available from Lancaster Co.), 0.5 g of PTFE and 10 g of ethyl alcohol were mixed. The resulting mixture was uniformly stirred for one hour at room temperature, and then made into a sheet from fibers formed by kneading them while evaporating an ethyl alcohol solvent.

The composite electrode material obtained was then pressed onto a nickel foam to obtain a composite electrode, which was then used to assemble a battery by constructing in the form of a porous composite electrode/non-woven fabric/porous composite electrode. This battery was put into a water cistern containing 1,000 ppm aqueous NaCl solution, charged up to 0.9V for 10 minutes, discharged down to −0.001V for 10 minutes, and maintained a dormant state for one minute, and then its CDI properties and cycle life were examined.

Example 7

2 g of activated carbon dried for at least 24 hours at 80° C., 2.5 g of acetylene black (moisture content: 0.03% by weight; ash content: 0.001% by weight; bulk density: 12.9 $lbsft^{-3}$; actual density: 1.95 g/ml; surface area: 80 $g^2m^{-1}$, available from Osaka Gas Co.), 8 g of porous silica gel (231-545-4, 0.040-0.063 mm, available from Lancaster Co.), 0.5 g of PTFE and 10 g of ethyl alcohol were mixed. The resulting mixture was uniformly stirred for one hour at room temperature, and then made into a sheet from fibers formed by kneading them while evaporating an ethyl alcohol solvent.

The composite electrode material obtained was then pressed onto a nickel foam to obtain a composite electrode, which was then used to assemble a battery by constructing in the form of a porous composite electrode/non-woven fabric/porous composite electrode. This battery was put into a water cistern containing 1,000 ppm aqueous NaCl solution, charged up to 0.9V for 10 minutes, discharged down to −0.001V for 10 minutes, and maintained a dormant state for one minute, and then its CDI properties and cycle life were examined.

Example 8

1 g of activated carbon dried for at least 24 hours at 80° C., 2.5 g of acetylene black (moisture content: 0.03% by weight; ash content: 0.001% by weight; bulk density: 12.9 $lbsft^{-3}$; actual density: 1.95 g/ml; surface area: 80 $g^2m^{-1}$, available from Osaka Gas Co.), 9 g of porous silica gel (231-545-4, 0.040-0.063 mm, available from Lancaster Co.), 0.5 g of PTFE and 10 g of ethyl alcohol were mixed. The resulting mixture was uniformly stirred for one hour at room temperature, and then made into a sheet from fibers formed by kneading them while evaporating an ethyl alcohol solvent.

The composite electrode material obtained was then pressed onto a nickel foam to obtain a composite electrode, which was then used to assemble a battery by constructing in the form of a porous composite electrode/non-woven fabric/porous composite electrode. This battery was put into a water cistern containing 1,000 ppm aqueous NaCl solution, charged up to 0.9V for 10 minutes, discharged down to −0.001V for 10 minutes, and maintained a dormant state for one minute, and then its CDI properties and cycle life were examined.

Comparative Example 1

4 g of carbon aerogel dried for at least 24 hours at 80° C., 1 g of acetylene black (moisture content: 0.03% by weight; ash content: 0.001% by weight; bulk density: 12.9 $lbsft^{-3}$, actual density: 1.95 g/ml; surface area: 80 $g^2m^{-1}$, available from Osaka Gas Co.), 0.25 g of PTFE and 5 g of ethyl alcohol were mixed. The resulting mixture was uniformly stirred for one hour at room temperature, and then made into a sheet form.

The electrode material obtained was then pressed onto a nickel foam to obtain an electrode, which was then used to assemble a battery by constructing in the form of an anode/non-woven fabric/a cathode. This battery was put into a water cistern containing 1,000 ppm aqueous NaCl solution, charged up to 0.9V for 10 minutes, discharged down to −0.001V for 10 minutes, and maintained a dormant state for one minute, and then its CDI properties and cycle life were examined.

Comparative Example 2

10 g of activated carbon dried for at least 24 hours at 80° C., 2.5 g of acetylene black (moisture content: 0.03% by weight; ash content: 0.001% by weight; bulk density: 12.9 lbsft$^{-3}$; actual density: 1.95 g/ml; surface area: 80 g$^2$m$^{-1}$, available from Osaka Gas Co.), 0.5 g of PTFE and 10 g of ethyl alcohol were mixed. The resulting mixture was uniformly stirred for one hour at room temperature, and then made into a sheet form.

The electrode material obtained was then pressed onto a nickel foam to obtain an electrode, which was then used to assemble a battery by constructing in the form of an anode/non-woven fabric/a cathode. This battery was put into a water cistern containing 1,000 ppm aqueous NaCl solution, charged up to 0.9V for 10 minutes, discharged down to −0.001V for 10 minutes, and maintained a dormant state for one minute, and then its CDI properties and cycle life were examined.

Figure 1:
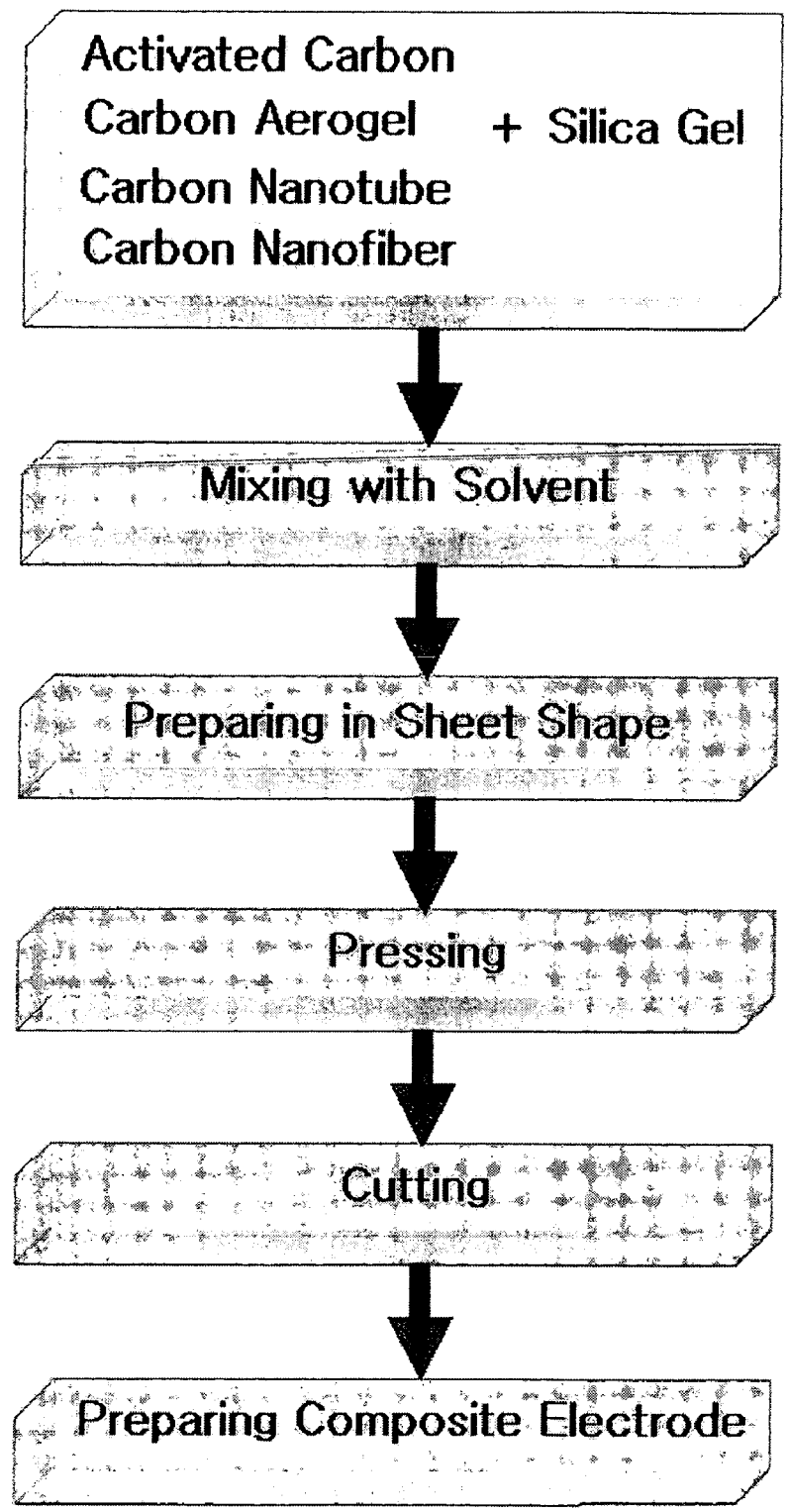
Figure 2:
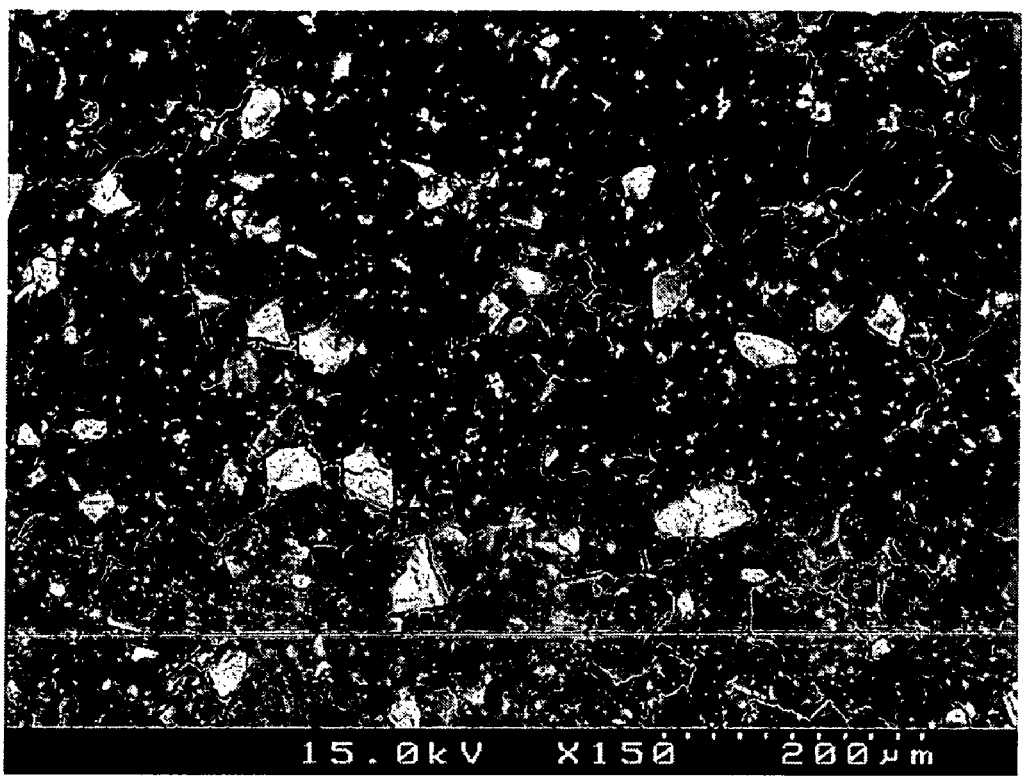

FIG. 2 is a scanning electron microphotograph showing the surface of the carbon-porous media composite electrode material prepared in Example 2 of the present invention.

Figure 3A:
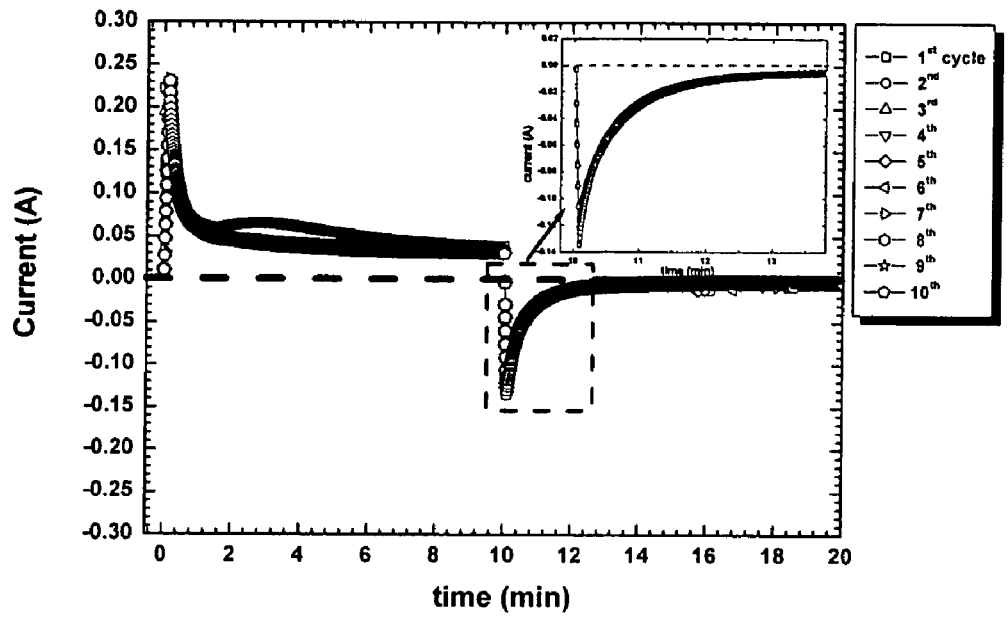
Figure 3B:
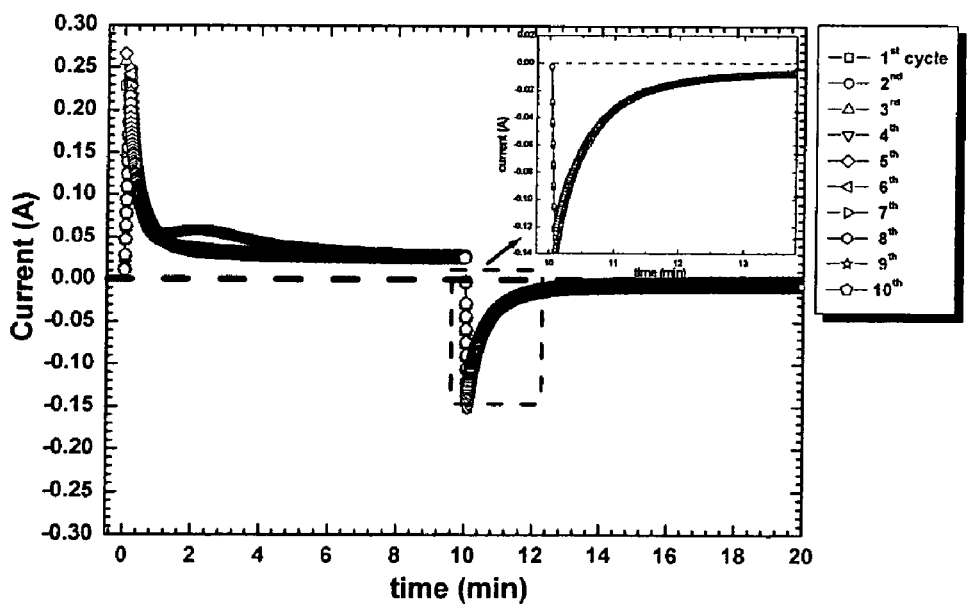
Figure 3C:
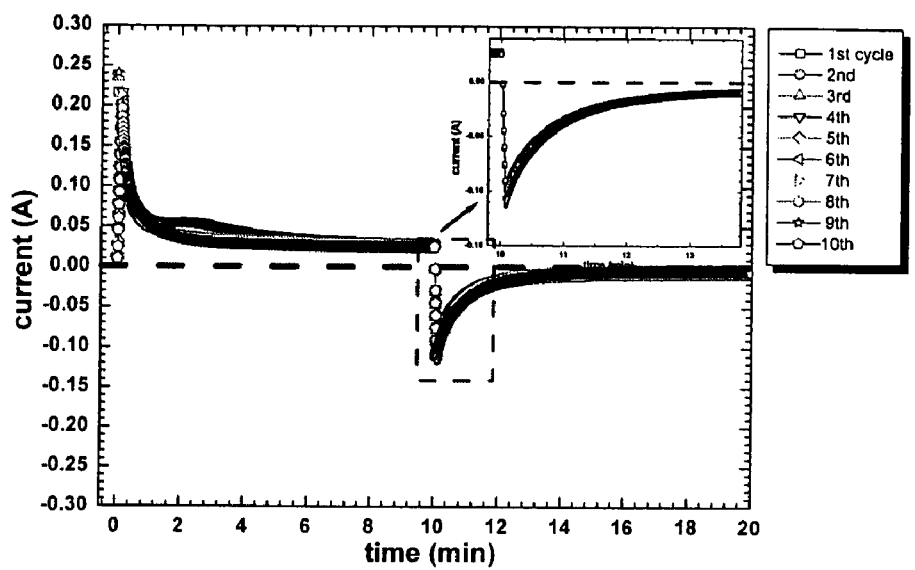
Figure 3D:
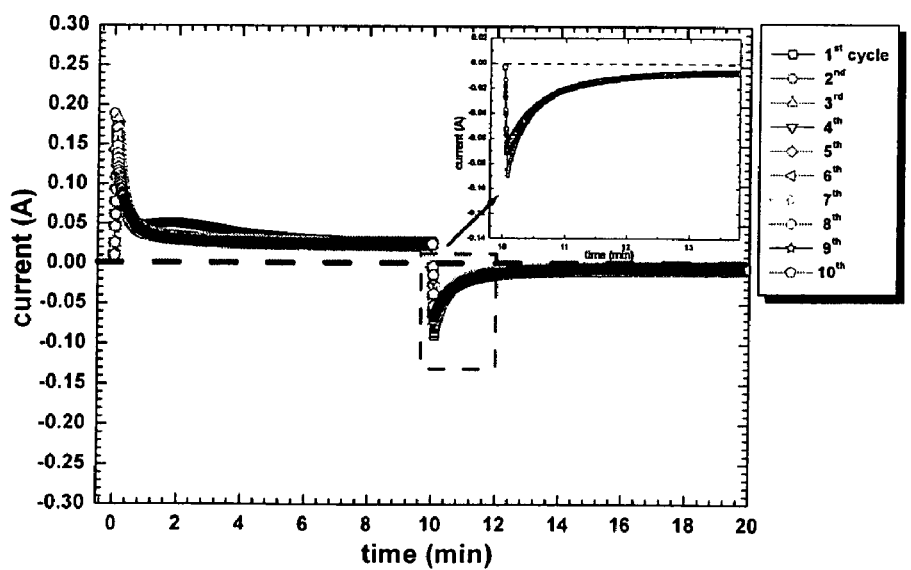

FIGS. 3a and 3b are time-current curves respectively showing charging and discharging characteristics to 10 cycles of the batteries prepared in Comparative Example 1 (FIG. 3a) and Examples 1 to 3 (FIGS. 3b to 3d) of the present invention. It can be seen from those figures that the CDI efficiency, i.e., the ratio of charging current to discharging current depending on time, of the composite electrode of the present invention was increased by 50 to 60% compared with the value of the electrode prepared only with a carbon electrode active material.

Figure 4:
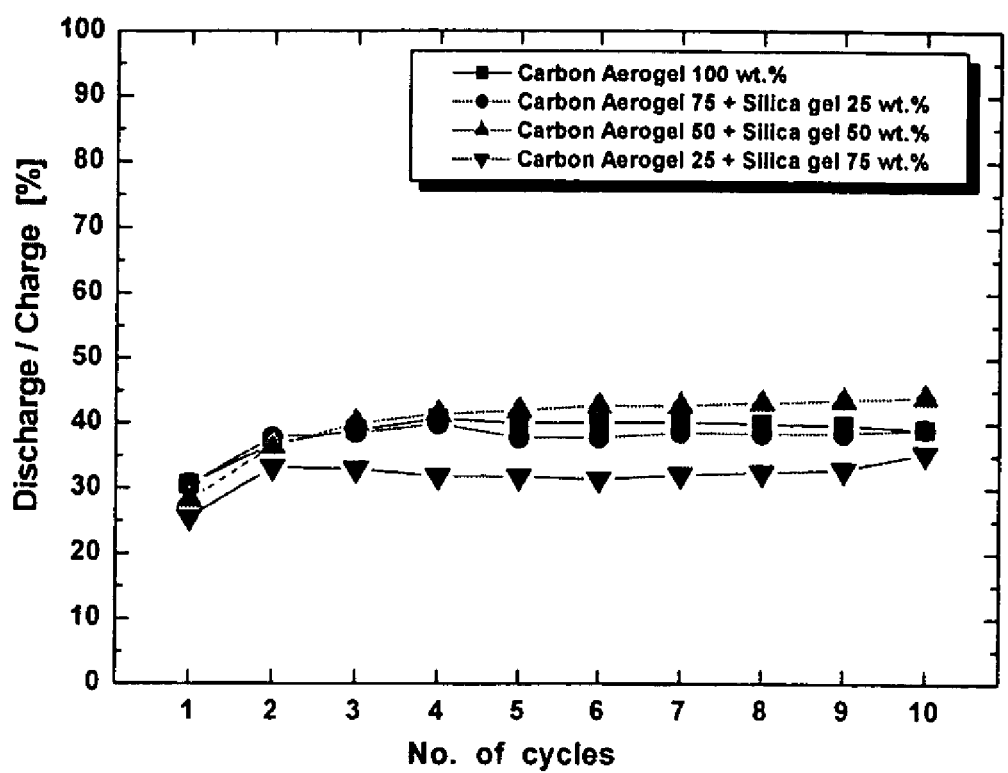

FIG. 4 respectively shows charging and discharging efficiencies of the batteries prepared in Examples 1 to 3 of the present invention and Comparative Example 1. It was found that, in the battery comprising the porous composite electrode prepared according to the present invention, the electrode active material was not separated from an electrode upon charging and discharging, and its wetting ability to an aqueous electrolyte was enhanced.

Figure 5A:
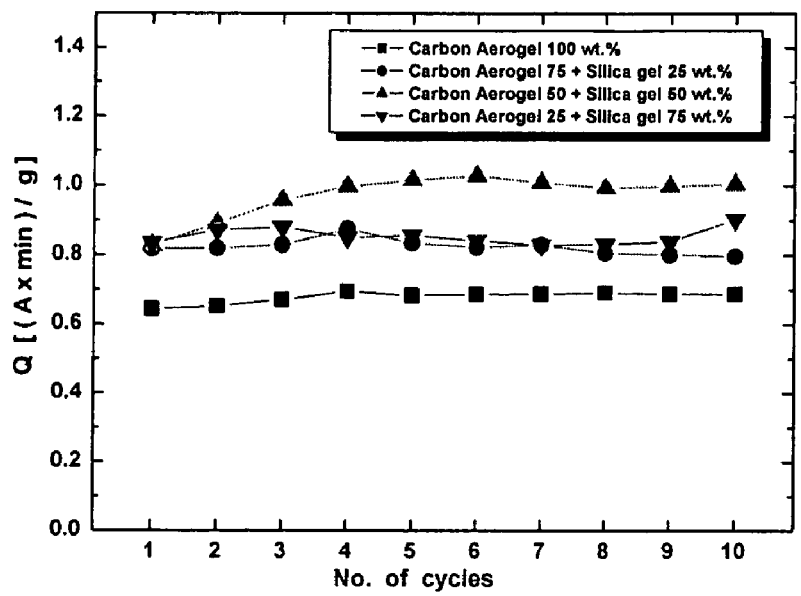
Figure 5B:
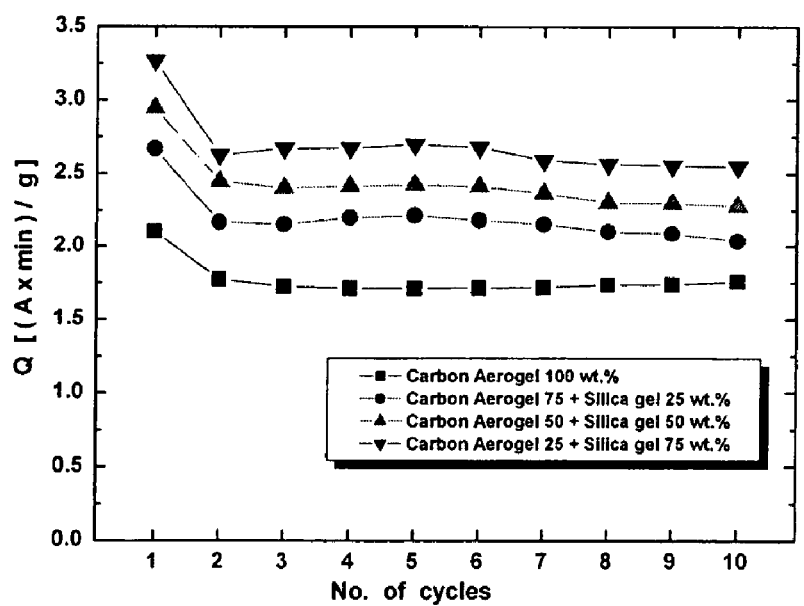

FIGS. 5a and 5b show electric charge changes per weight of an electrode active material upon charging (FIG. 5a) and discharging (FIG. 5b) of the batteries prepared in Examples 1 to 3 of the present invention and Comparative Example 1. It can be seen from those figures that the battery using the porous composite electrode prepared according to the present invention has a small electric charge differences between charging and discharging. This means that, in the battery using the composite electrode according to the present invention, most of the electric charge once charged is discharged.

Figure 6A:
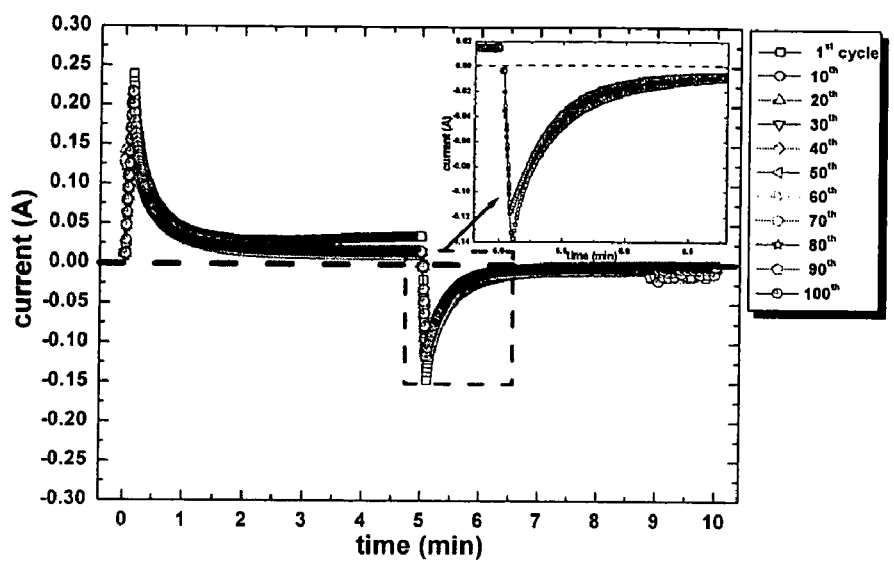
Figure 6B:
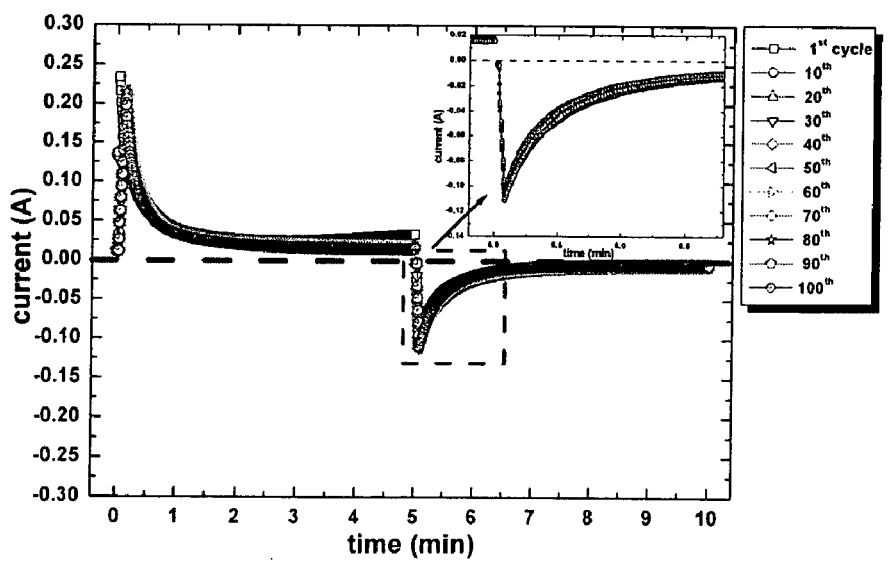
Figure 6C:
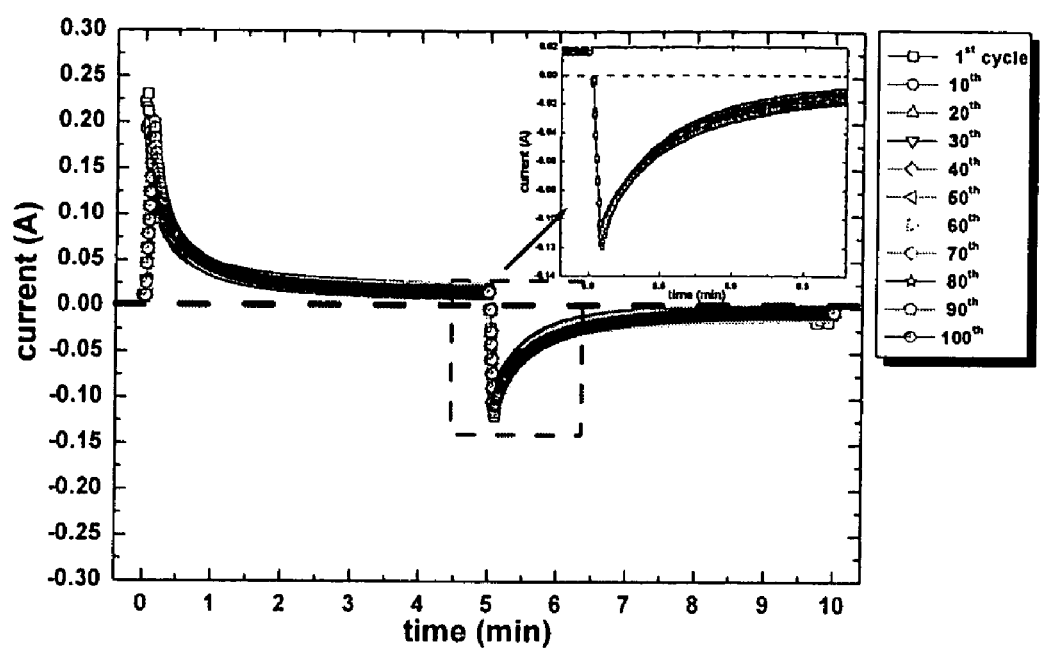

FIG. 6 is time-current curves respectively showing charging and discharging characteristics to 100 cycles of the batteries prepared in Comparative Example 1 (FIG. 6a), and Examples 1 and 2 (FIGS. 6b and 6c) using the porous composite electrode of the present invention. It can be seen from those figures that charging and discharging efficiencies of the composite electrode of the present invention were increased by 50 to 60% compared with the value of the electrode prepared only with a carbon electrode active material.

Figure 7:
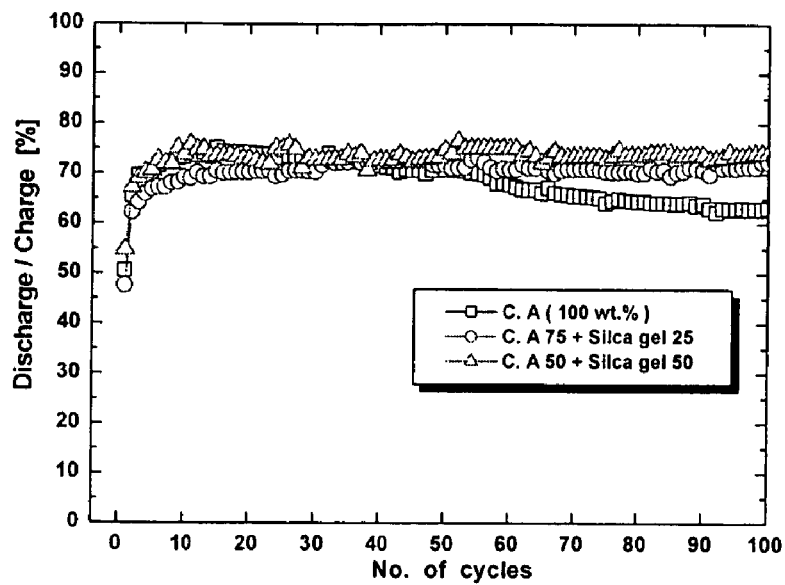

FIG. 7 is a graph showing charging and discharging efficiencies using the result of charging and discharging to 100 cycles of the batteries prepared in Examples 1 and 2, and Comparative Example 1. It can be seen that efficiencies of discharging to charging were increased by at least 50% at 100 or more cycles in the battery using the porous composite electrode prepared according to the present invention.

Figure 8:
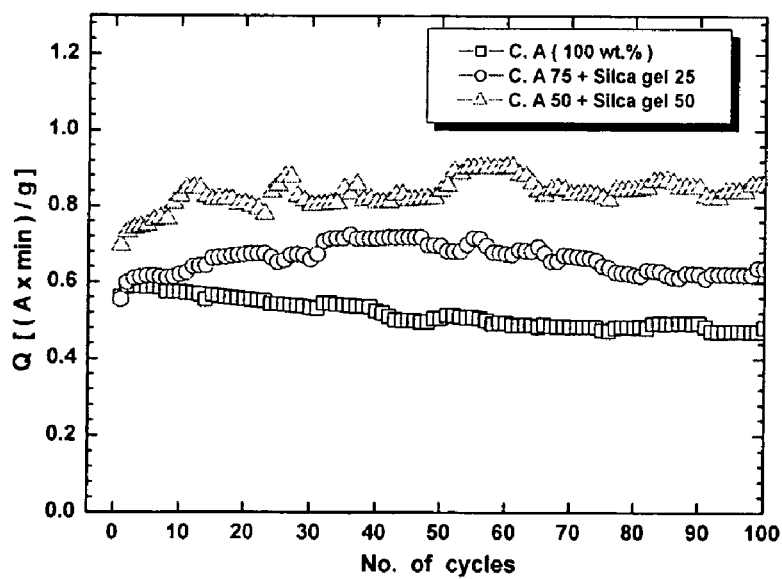
Figure 9A:
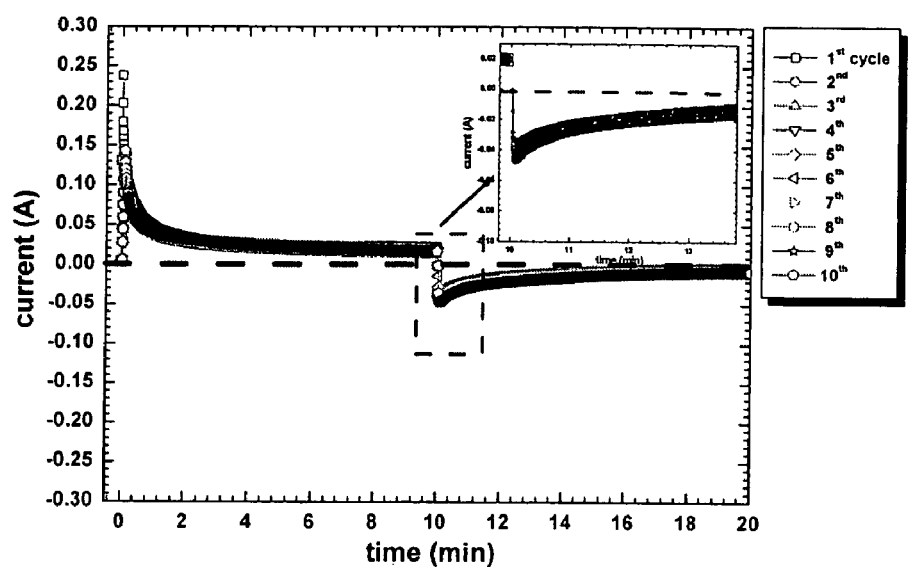
Figure 9B:
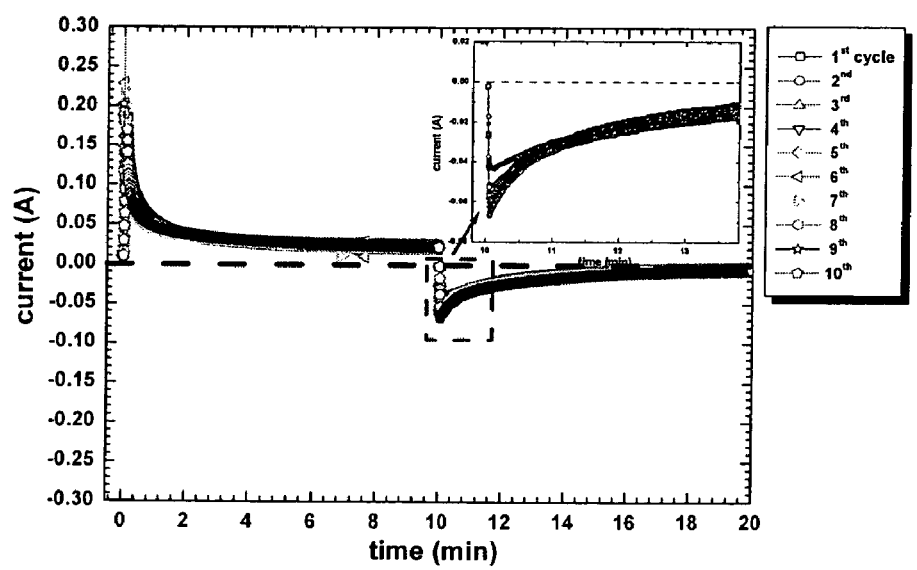
Figure 9C:
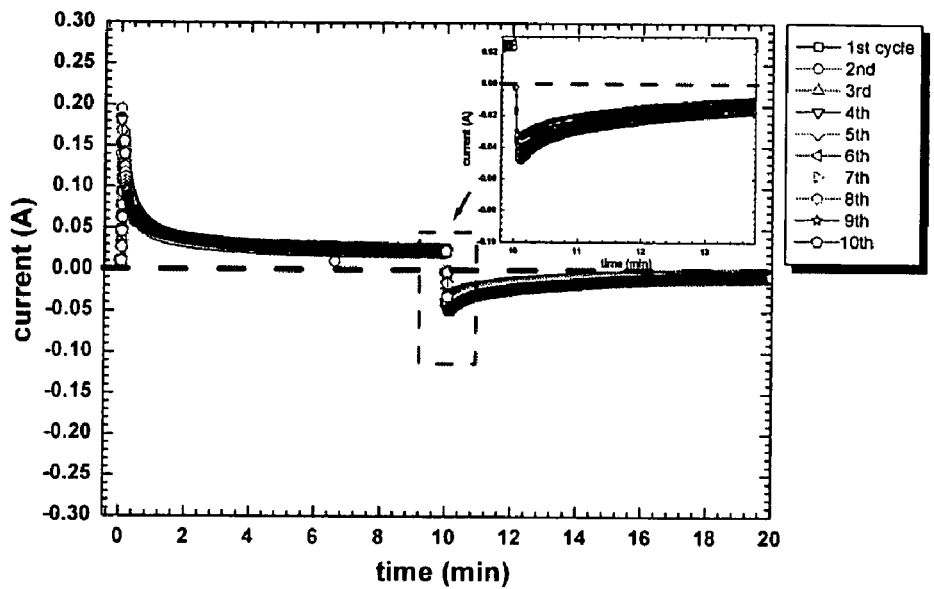
Figure 9D:
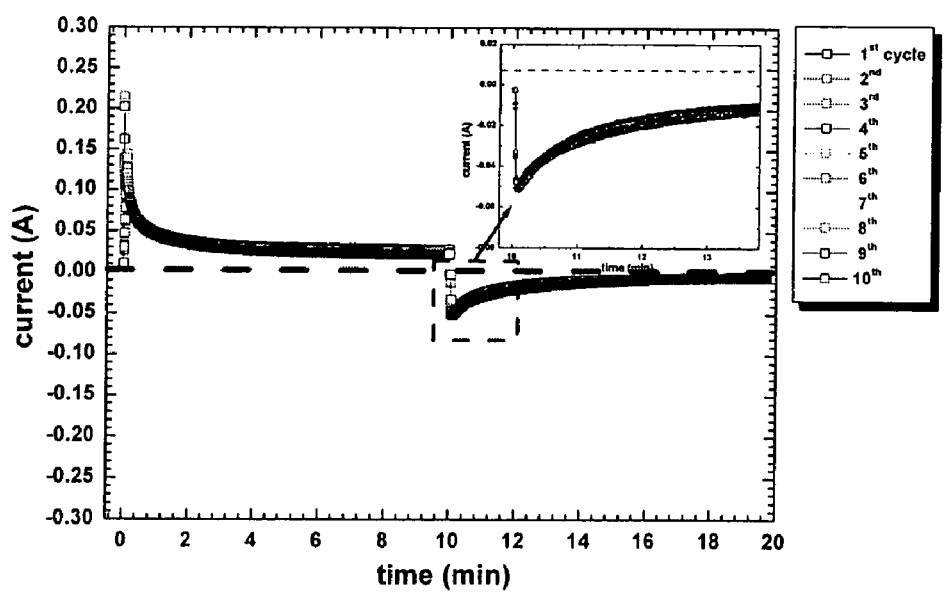
Figure 9E:
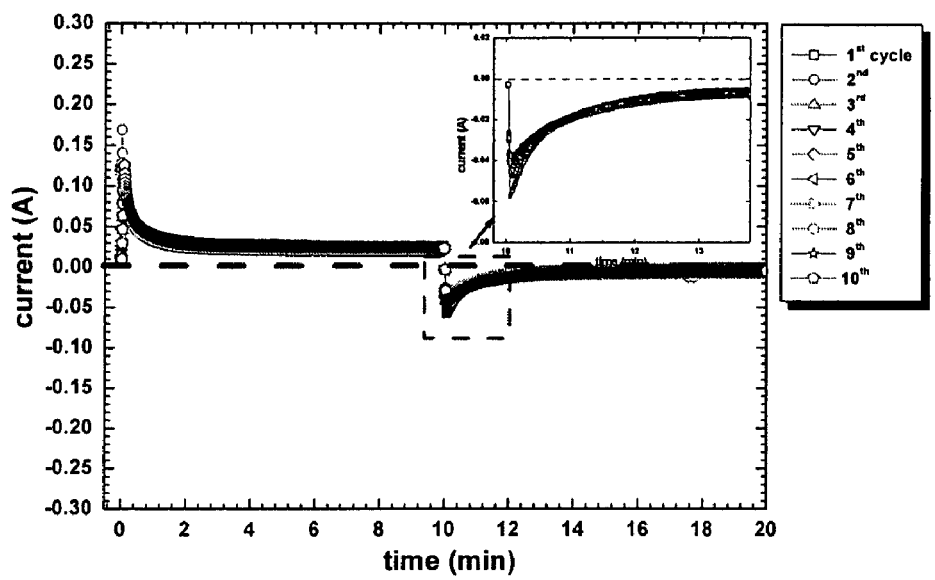
Figure 9F:
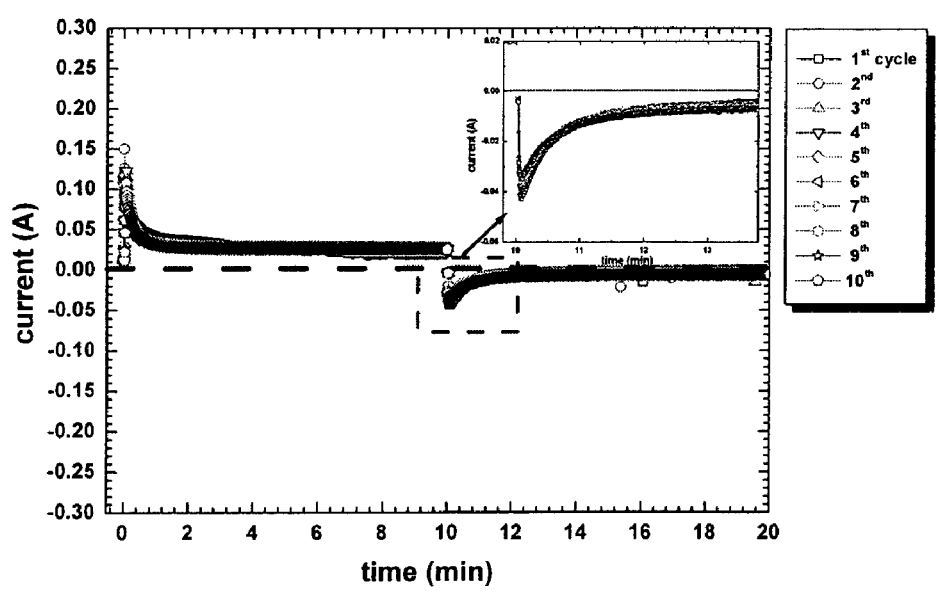

FIG. 8 shows electric charge change per weight of an electrode active material upon charging and discharging to 100 cycles of the batteries prepared in Examples 1 and 2, and Comparative Example 1. It can be seen that the battery using the porous composite electrode prepared according to the present invention has a small electric charge differences between charging and discharging. This means that, in the battery using the composite electrode according to the present invention, most of the electric charge once charged is discharged.

FIGS. 9a to 9f are time-current curves respectively showing charging and discharging characteristics to 100 cycles of the batteries prepared in Comparative Example 2 (FIG. 9a) and Examples 4 to 8 (FIGS. 9b and 9f) of the present invention. It can be seen that charging and discharging efficiencies of the composite electrode of the present invention were increased by 20 to 30% compared with the value of the electrode prepared only with a carbon electrode active material.

FIGS. 10a and 10b respectively shows efficiencies of electric charge upon charging and discharging of the batteries prepared in Comparative Example 2 and Examples 4 to 8 of the present invention. 'A' shows the result of the battery prepared in Comparative Example 2, and 'B' to 'F' show the results of the batteries prepared in Examples 4 to 8. It can be seen that, in the battery comprising the porous composite electrode prepared according to the present invention, an electrode active material was not separated from the electrode upon charging and discharging, and its wetting ability to an aqueous electrolyte is enhanced, by which its electric charge upon charging was increased by 20%.

FIGS. 11a and 11b are time-current curves respectively showing charging and discharging characteristics to 100 cycles of the batteries prepared in Comparative Example 2 and Example 6 of the present invention. It can be seen that, in the electrode made only of a carbon electrode active material, current change upon discharging was sharply decreased as the number of cycles was increased during 100 cycles, while in the composite electrode of the present invention, it was maintained nearly constant.

Figure 12A:
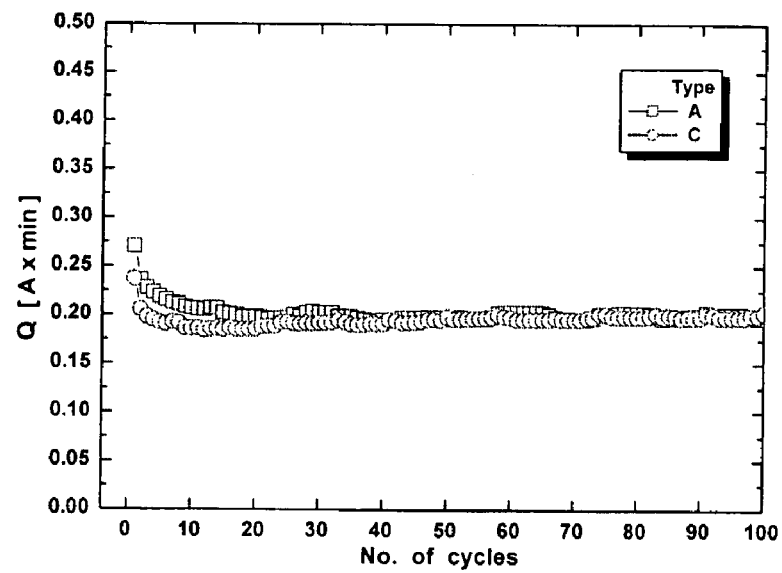
Figure 12B:
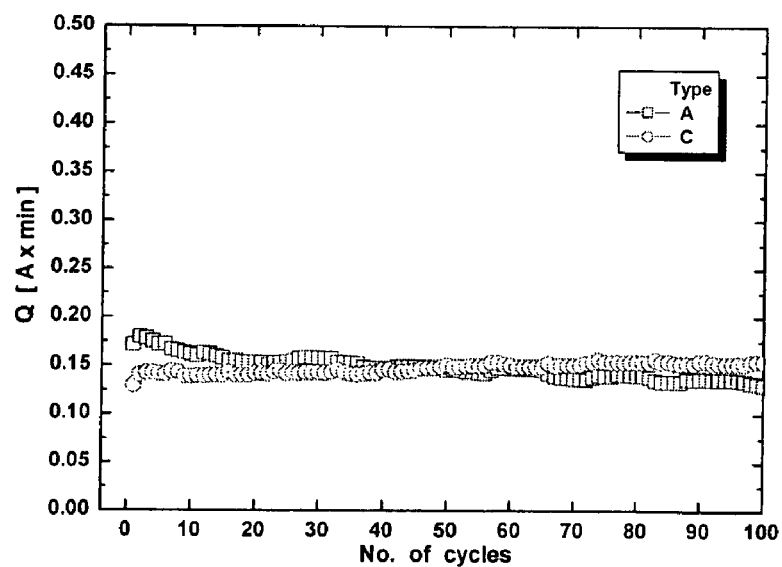
Figure 12C:
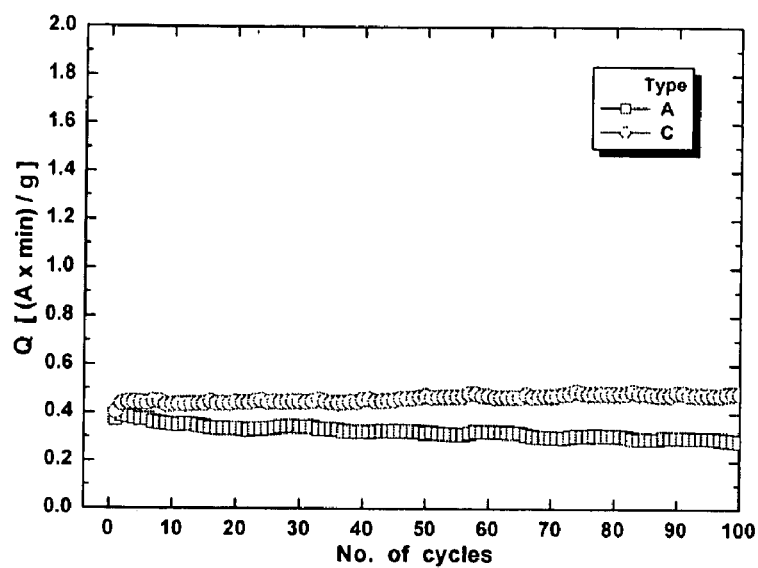
Figure 12D:
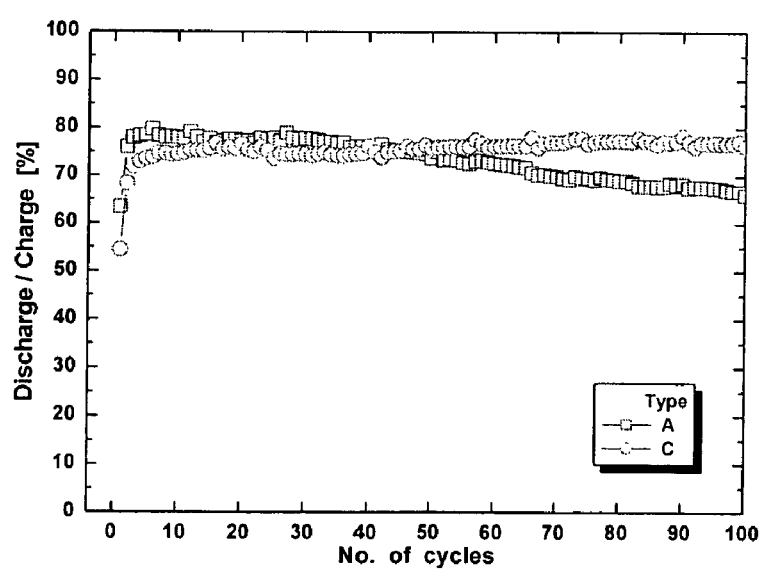

FIGS. 12a to 12d are graphs respectively showing electric charges upon charging (FIG. 12a), electric charges upon discharging (FIG. 12b), specific electric charges upon discharging (FIG. 12c), and charging and discharging efficiencies (FIG. 12d) during 100 cycles of charging and discharging for the batteries prepared in Example 6 and Comparative Example 2. Type A shows the result of the electrode of Comparative Example 2, and Type C shows the result of the composite electrode of Example 6. The average electric charge upon charging during 100 cycles is 0.200 [A·min.] for the electrode prepared in Comparative Example 2, which is 3.5% higher compared with the value of 0.193 [A·min.] for the composite electrode of Example 6 (FIG. 12a). Meanwhile, although the average electric charge upon discharging of the electrode of Comparative Example 2 is the same as the value of 0.146 [A·-min] for the composite electrode of Example 6, it was gradually decreased as the number of cycles was increased, so as to reach to 0.130 [A·min.] for 100th cycle, which is 18% lower than the value of 0.154 [A·min.] for the composite electrode of the present invention (FIG. 12b). Thus, it was found that in the composite electrode of the present invention, electric charge upon discharging to 100 cycles is very stable, and tends to increase to some extent. It can be understood that such result came from the fact that due to the addition of silica gel to carbon, wetting ability of the electrode to an aqueous NaCl solution is increased, and thus, its cycle characteristics can be stabilized, and that due to the increase of the effective specific surface of the electrode, an excellent electric charge upon discharging can be exhibited only by using a small amount of activated carbon.

In the average specific electric charge upon discharging, it is 0.317 [(A·min.)/g] for the electrode of Comparative 2, while it is 0.456 [(A·min.)/g] for the composite electrode of Example 6. That is, it was increased by 43% (FIG. 12c) in the composite electrode according to the present invention. It can be understood that the composite electrode of the present invention can exhibit stable and high specific electric charge upon discharging, resulting from the increase of wetting ability of carbon due to the addition of silica gel to carbon, while the electrode made only of a carbon electrode active material cannot show such effect because wetting ability of carbon active material is low, and thus only small amount of activated carbon can actually participate in a cell reaction. Further, at 100th cycle, the average specific electric charge upon discharging is 0.482 [(A·min.)/g] for the composite electrode of the present invention, while it is only 0.283 [(A.min.)/g] for the electrode of Comparative Example 2. That is, it can be seen that the difference between them was increased more. It can be understood that as cycles go on, the difference in the amount of activated carbon actually participated in reaction is increased.

In the charging and discharge efficiency, it was very stable for the composite electrode of the present invention to be maintained at 75.6% during 100 cycles relative to the value of the first cycle. However, although it was excellent for the electrode of Comparative Example 2 to 40th cycle, it was decreased with the repetition of cycle and shows 73% (FIG. 12d) at 100th cycle, which is lower than that of the electrode of the present invention. Further, at 100th cycle, the charging and discharging efficiency is 66% for the electrode of Comparative Example 2, and it is 76% for the composite electrode of the present invention. Thus, it was found that the difference is about 10% or more. From the pattern of the graph of FIG. 12d, it is expected that such tendency will be more remarkable as the cycle is repeated more than 100 times.

In conclusion, the carbon-porous media composite electrode of the present invention in which silica gel is added to a carbon active material is very stable and high in charging and discharging efficiency, and shows excellent cycle characteristics without electric charge reduction as the cycle goes on. Therefore, it was found that it is suitable for an electrode for a secondary battery, capacitor or CDI.

As described above, according to the present invention, a carbon-porous media composite electrode material in which a carbon electrode active material is combined with a porous media, a composite electrode using the same, and a preparation method thereof were provided.

The carbon-porous media composite electrode of the present invention has superior wetting ability to an aqueous electrolyte and mechanical strength compared with the conventional carbon electrode made only of a carbon electrode active material. In addition, its preparation method is simple, and it is very stable and high in charging and discharging efficiency, and shows superior cycle characteristics as cycle goes on, even though only a small amount of a carbon active material is used.

Accordingly, it is expected that the composite electrode of the present invention can be applied for a secondary battery or a capacitor, or for preparing ultra pure water using a capacitive deionization process, purifying salty water, or the like.

What is claimed is:

1. A carbon-porous media composite electrode material, comprising:
   (a) 5 to 95% by weight of a carbon electrode active material, and
   (b) 5 to 95% by weight of a porous media, selected from the group consisting of silica gel, clay, $Al_2O_3$, $SiO_2$, $BaTiO_3$, a porous polymer and mixtures thereof, having a particle size distribution of from 0.1 to 100 μm and a particle density of from 0.1 to 2 g/cc.

2. The carbon-porous media composite electrode material according to claim 1, wherein the carbon electrode active material is selected from the group consisting of an activated carbon, a carbon aerogel, a carbon nanotube, a carbon nanofiber and mixtures thereof.

3. The carbon-porous media composite electrode material according to claim 1, further comprising a conductive material in an amount of 1 to 50% by weight.

4. The carbon-porous media composite electrode material according to claim 3, further comprising 1 to 20% by weight of a polymer binder to the total weight of a mixture of a carbon electrode active material, a porous media and a conductive material.

5. The carbon-porous media composite electrode material according to claim 4, wherein the polymer binder is selected from the group consisting of polytetrafluoroethylene, polyvinylidenefluoride, carboxymethylcellulose, hydropropylmethylcellulose, polyvinylalcohol and polyvinylchloride.

6. The carbon-porous media composite electrode material according to claim 1, which is in a sheet form.

7. A carbon-porous media composite electrode, comprising:
   (a) a foam or mesh of a metal selected from the group consisting of nickel, titanium and aluminum as a current collector, and
   (b) the carbon-porous media composite electrode material according to claim 6 pressed onto the foam or mesh of the metal selected from the group consisting of nickel, titanium and aluminum.

8. A capacitor, comprising the carbon-porous media composite electrode according to claim 7.

* * * * *